US012042462B2

(12) United States Patent
Akbar

(10) Patent No.: US 12,042,462 B2
(45) Date of Patent: Jul. 23, 2024

(54) ACUPRESSURE HEADBAND APPARATUS

(71) Applicant: Abdullah Farhad Akbar, Laguna Niguel, CA (US)

(72) Inventor: Abdullah Farhad Akbar, Laguna Niguel, CA (US)

( * ) Notice: Subject to any disclaimer, the term of this patent is extended or adjusted under 35 U.S.C. 154(b) by 719 days.

(21) Appl. No.: 17/240,063

(22) Filed: Apr. 26, 2021

(65) Prior Publication Data

US 2022/0339064 A1 Oct. 27, 2022

(51) Int. Cl.
*A61H 39/04* (2006.01)
*A41D 20/00* (2006.01)

(52) U.S. Cl.
CPC ............. *A61H 39/04* (2013.01); *A41D 20/00* (2013.01); *A61H 2201/1253* (2013.01); *A61H 2201/1607* (2013.01); *A61H 2201/165* (2013.01); *A61H 2201/1654* (2013.01); *A61H 2205/02* (2013.01)

(58) Field of Classification Search
CPC ............ A61H 39/04; A61H 2201/1607; A61H 2201/165; A61H 2205/02
See application file for complete search history.

(56) References Cited

U.S. PATENT DOCUMENTS 3,659,614 A 5/1972 Jankelson
4,248,215 A 2/1981 Bleakley
4,944,289 A 7/1990 Matthews
6,554,787 B1 * 4/2003 Griffin .................. A61H 23/00 602/17
D736,394 S 8/2015 Owoc
2006/0161200 A1 7/2006 Fallah
2007/0185527 A1 * 8/2007 Babaev .............. A61B 17/1325 606/204
2012/0253384 A1 * 10/2012 Bosnyak ............... A61H 11/00 606/204.15
2012/0302929 A1 11/2012 Tkachenko
2020/0155872 A1 5/2020 Chen

FOREIGN PATENT DOCUMENTS

WO WO2006078641 7/2006

* cited by examiner

*Primary Examiner* — Darwin P Erezo
*Assistant Examiner* — Christina C Lauer

(57) ABSTRACT

An acupressure headband apparatus for helping people sleep includes a headband having a band front side, a band back side, a band left edge, a band right edge, an open band top edge, and a band bottom edge. A strap is coupled to the band right edge. A pair of engagement members is coupled to the headband and the strap. The pair of engagement members is selectively engageable to secure the headband around a user's head. An insert is selectively positioned within the headband through the band top edge between the band front side and the band back side. The insert has an insert front side and an insert back side. A pair of temple pads is coupled to the insert. Each temple pad is coupled to the insert back side and aligns with the user's temples while the headband is worn.

9 Claims, 7 Drawing Sheets

ACUPRESSURE HEADBAND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to acupressure devices and more particularly pertains to a new acupressure device for helping people sleep. The present device includes a plurality of forehead pads to apply pressure to forehead acupressure points. There is also a pair of temple pads that may be adjusted during use for proper positioning.

(2) Description of Related Art Including Information Disclosed Under 37 CFR 1.97 and 1.98

The prior art relates to acupressure devices. Known devices are typically designed for headache relief and do not include a concentration of pads for forehead acupressure points. These devices often include fixed pressure points that cannot be independently adjusted while the band is being worn.

BRIEF SUMMARY OF THE INVENTION

An embodiment of the disclosure meets the needs presented above by generally comprising a headband having a band front side, a band back side, a band left edge, a band right edge, an open band top edge, and a band bottom edge. A strap is coupled to the band right edge. A pair of engagement members is coupled to the headband and the strap. The pair of engagement members is selectively engageable to secure the headband around a user's head. An insert is coupled to the headband. The insert is selectively positioned within the headband through the band top edge between the band front side and the band back side. The insert has an insert front side and an insert back side. A pair of temple pads is coupled to the insert. Each temple pad is coupled to the insert back side and is configured to align with the user's temples while the headband is worn.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
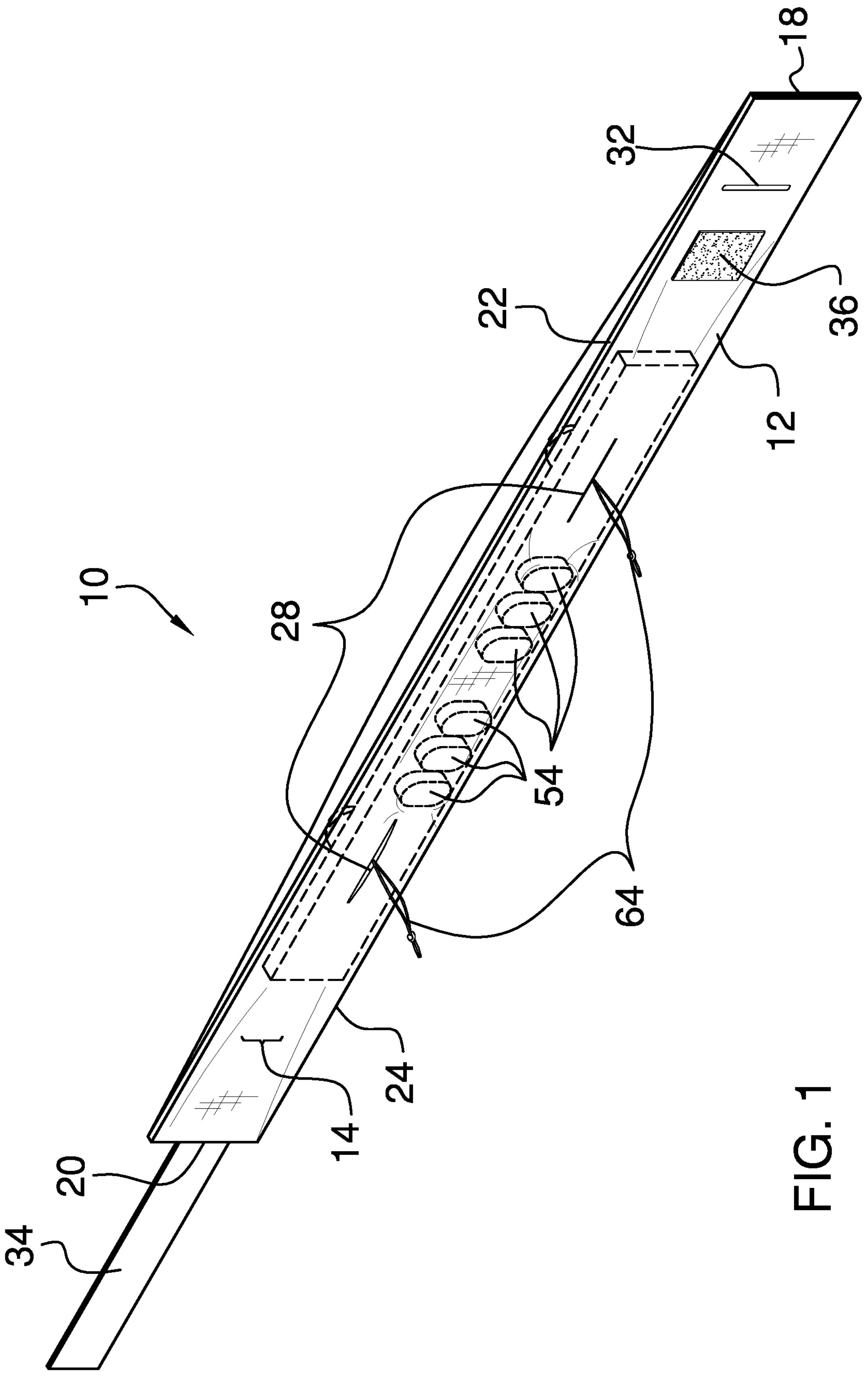
FIG. 1 is an isometric view of an acupressure headband apparatus according to an embodiment of the disclosure.
Figure 2:
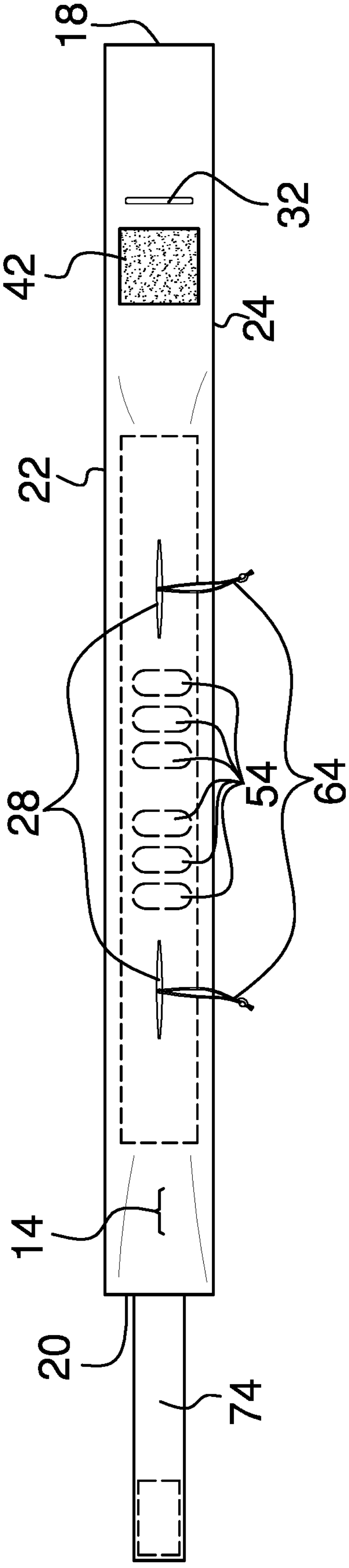
FIG. 2 is a front elevation view of an embodiment of the disclosure.
Figure 3:
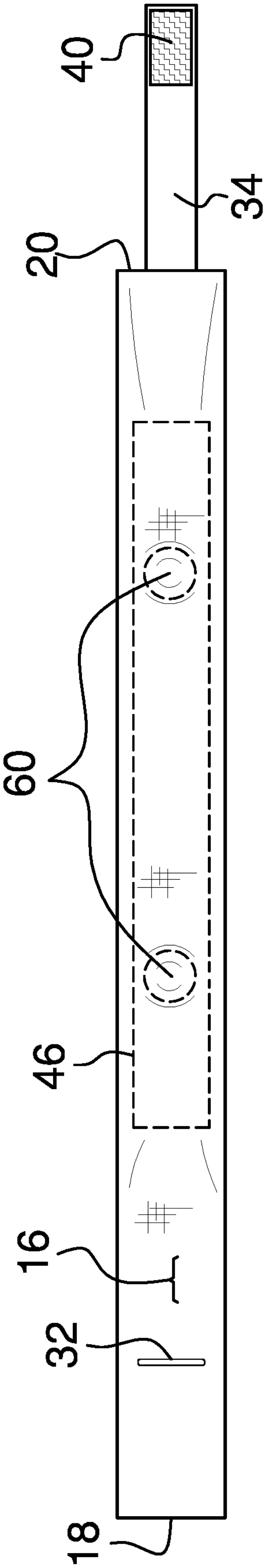
FIG. 3 is a rear elevation view of an embodiment of the disclosure.
Figure 4:
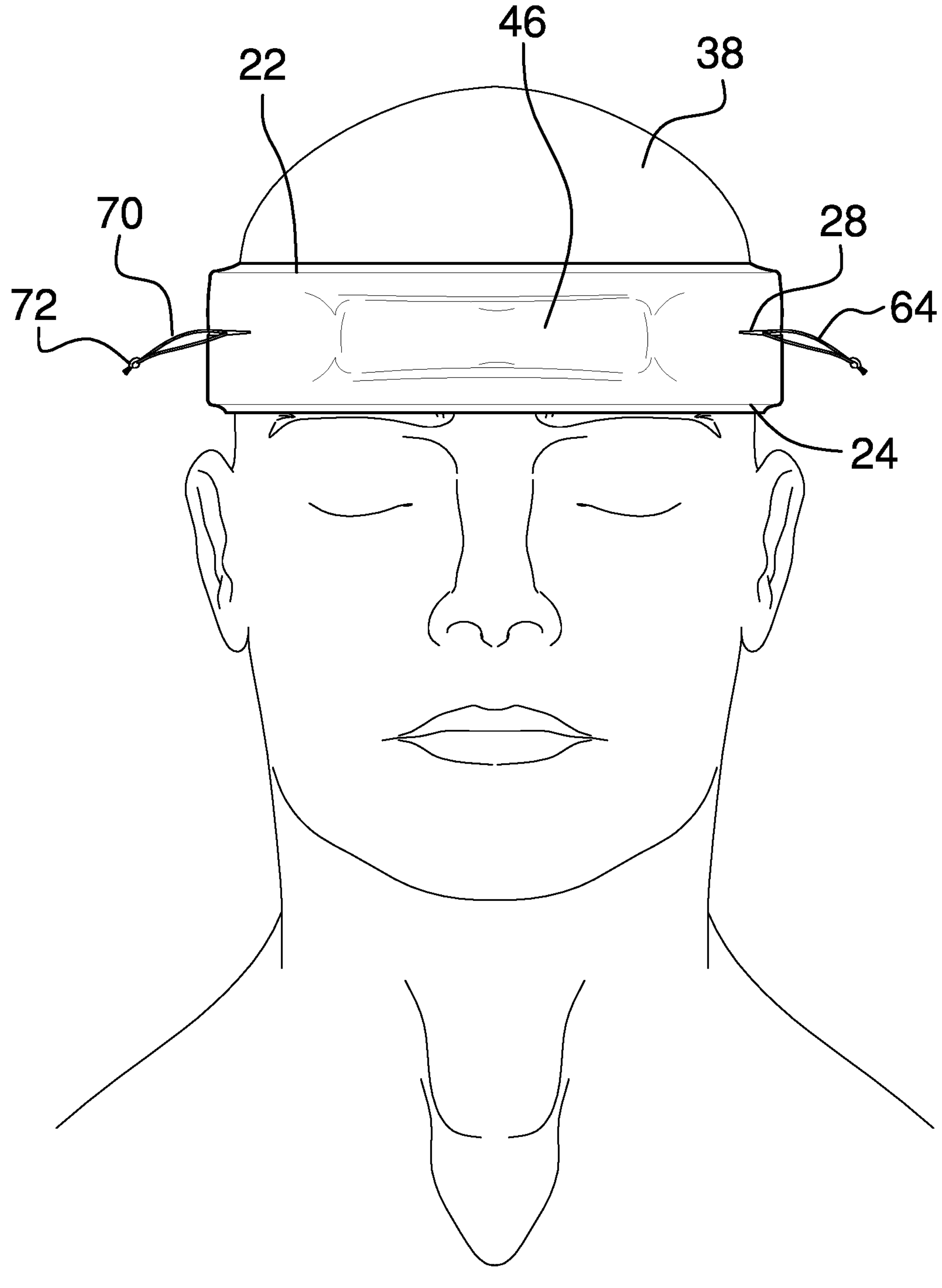
FIG. 4 is an in-use front elevation view of an embodiment of the disclosure.
Figure 5:
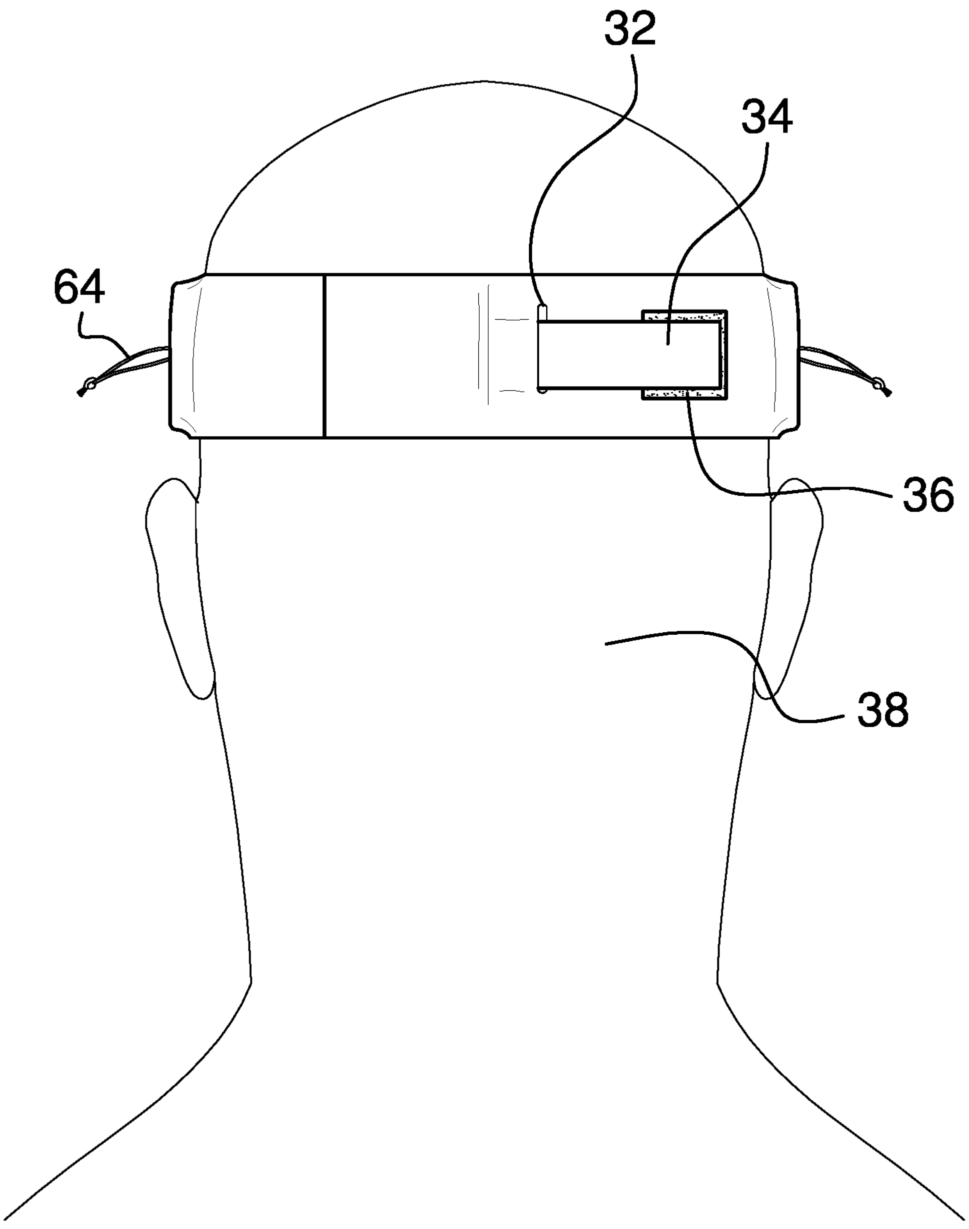
FIG. 5 is an in-use rear elevation view of an embodiment of the disclosure.

With reference now to the drawings, and in particular to FIGS. 1 through 8 thereof, a new acupressure device embodying the principles and concepts of an embodiment of the disclosure and generally designated by the reference numeral 10 will be described.

As best illustrated in FIGS. 1 through 8, the acupressure headband apparatus 10 generally comprises a headband 12 having a band front side 14, a band back side 16, a band left edge 18, a band right edge 20, an open band top edge 22, and a band bottom edge 24. The band front side 14 has a pair of adjustment slits 28 extending therethrough. The headband 12 has a strap slit 32 extending from the band front side 14 through the band back side 16.

A strap 34 is coupled to the band right edge 20. The strap 34 is slidably engageable through the strap slit 32. A pair of engagement members 36 is coupled to the headband 12 and the strap 34. The pair of engagement members 36 is selectively engageable to secure the headband 12 around a user's head 38. The pair of engagement members 36 includes a first engagement member 40 coupled to the strap 34 and a second engagement member 42 coupled to the band front side 14 proximal the strap slit 32. Each engagement member 36 may be a selectively engageable fastener such as, but not limited to, hook-and-loop, buttons, snaps, and the like.

Figure 6:
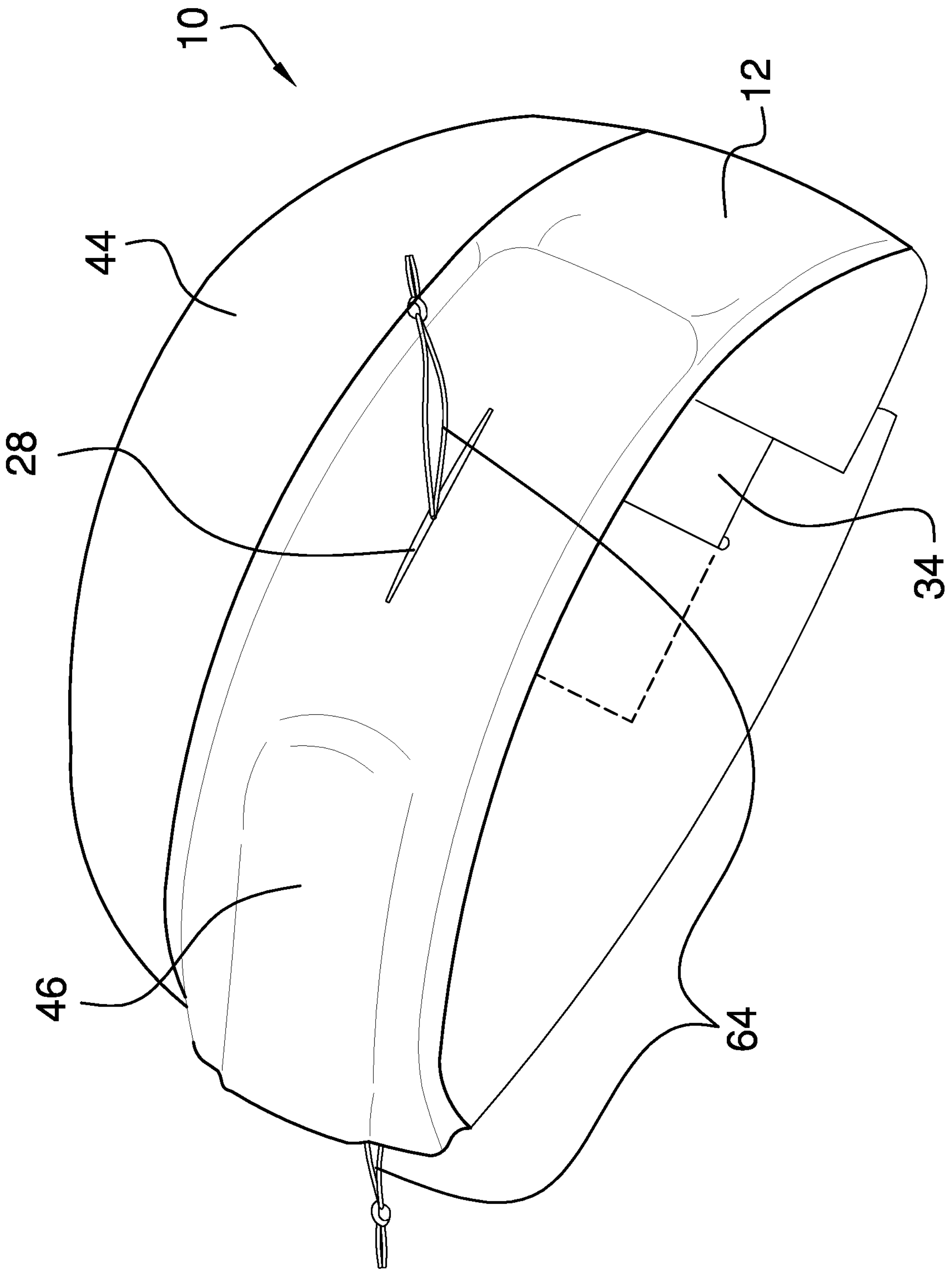
FIG. 6 is an isometric view of an embodiment of the disclosure.
Figure 7:
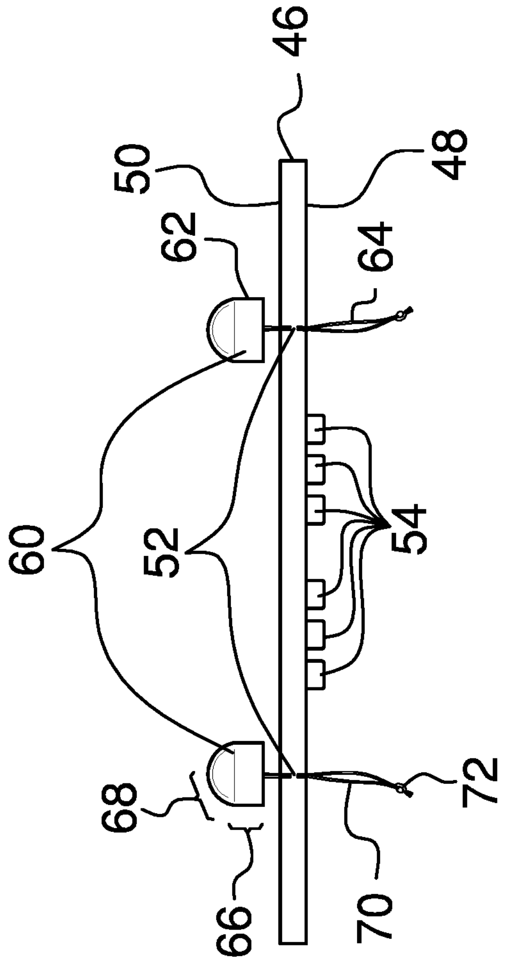
FIG. 7 is a detail view of an embodiment of the disclosure.

A head covering 44 may be coupled to the headband 12. The head covering 44 is coupled to the band top edge 22 and may fully cover the user's head 38 as seen in FIG. 6.

An insert 46 is coupled to the headband 12. The insert 46 is selectively positioned within the headband 12 through the band top edge 22 between the band front side 14 and the band back side 16. The insert 46 has an insert front side 48 and an insert back side 50. The insert 46 has a pair of adjustment apertures 52 extending therethrough.

A plurality of forehead pads 54 may be coupled to the insert 46. Each forehead pad 54 is coupled to the insert front side and configured to align with a plurality of acupressure points between the user's temples. Each forehead pad 54 may be obround. The plurality of forehead pads 54 may be arranged in two arrays of three forehead pads 54.

A pair of temple pads 60 is coupled to the insert. Each temple pad 60 is coupled to the insert back side 50 and configured to align with the user's temples while the headband is worn. Each of the temple pads 60 may have a pad portion 62 and an adjustment string portion 64 coupled to the pad portion 62. Each pad portion 62 may have a cylindrical section 66 and a hemispherical section 68. The adjustment string portion 64 is slidably coupled through the respective adjustment aperture 52 and adjustment slit 28. The adjustment string portion 64 may include a loop 70 and a slider 72 to tighten the respective pad portion 62 in a desired position.

Figure 8:
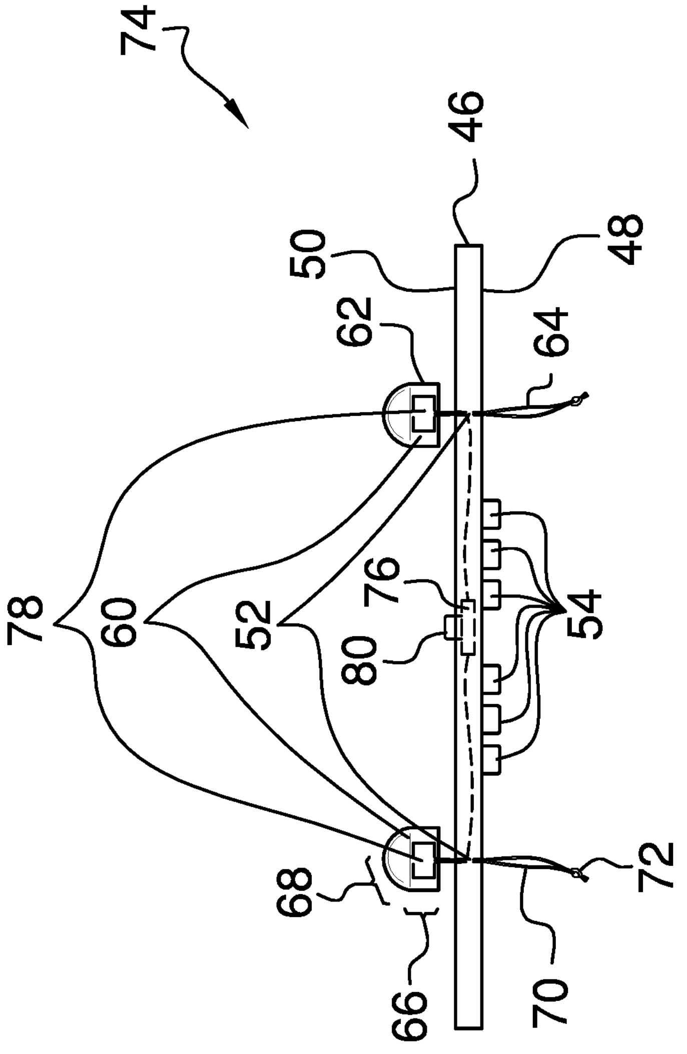
FIG. 8 is a detail view of an embodiment of the disclosure.

An alternative embodiment of the invention 74 shown in FIG. 8 may include a battery 76 coupled within the headband 12. A pair of vibrational motors 78 is coupled within the pair of temple pads 60 and is in operational communication with the battery 76 and a control switch 80.

In use, the headband 12 is placed on the user's head 38 to position the plurality of forehead pads 54 between the user's temples. The pair of temple pads 60 can then be adjusted by pulling on the adjustment string portions 64 to properly position the pair of temple pads 60 on the user's temples.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An acupressure headband apparatus comprising:

a headband having a band front side, a band back side, a band left edge, a band right edge, an open band top edge, and a band bottom edge;

a strap coupled to the band right edge;

a pair of engagement members coupled to the headband and the strap, the pair of engagement members being selectively engageable to secure the headband around a user's head;

an insert coupled to the headband, the insert being selectively positioned within the headband through the band top edge between the band front side and the band back side, the insert having an insert front side and an insert back side;

a pair of temple pads coupled to the insert, each temple pad being coupled to the insert back side and configured to align with the user's temples while the headband is worn; and the band front side having a pair of adjustment slits extending therethrough; the insert having a pair of adjustment apertures extending therethrough; each of the temple pads having a pad portion and an adjustment string portion coupled to the pad portion, the adjustment string portion being slidably coupled through the respective adjustment aperture.

2. The acupressure headband apparatus of claim 1 further comprising a plurality of forehead pads coupled to the insert, each forehead pad being coupled to the insert front side and configured to align with a plurality of acupressure points between the user's temples.

3. The acupressure headband apparatus of claim 2 further comprising the plurality of forehead pads being arranged in two arrays of three forehead pads.

4. The acupressure headband apparatus of claim 2 further comprising each forehead pad being obround.

5. The acupressure headband apparatus of claim 1 further comprising each pad portion having a cylindrical section and a hemispherical section.

6. The acupressure headband apparatus of claim 1 further comprising the adjustment string portion including a loop and a slider.

7. The acupressure headband apparatus of claim 1 further comprising the headband having a strap slit extending from the band front side through the band back side; the strap being slidably engageable through the strap slit.

8. The acupressure headband apparatus of claim 7 further comprising the pair of engagement members including a first engagement member coupled to the strap and a second engagement member coupled to the band front side proximal the strap slit.

9. An acupressure headband apparatus comprising:

a headband having a band front side, a band back side, a band left edge, a band right edge, an open band top edge, and a band bottom edge, the band front side having a pair of adjustment slits extending therethrough, the headband having a strap slit extending from the band front side through the band back side;

a strap coupled to the band right edge, the strap being slidably engageable through the strap slit;

a pair of engagement members coupled to the headband and the strap, the pair of engagement members being selectively engageable to secure the headband around a user's head, the pair of engagement members including a first engagement member coupled to the strap and a second engagement member coupled to the band front side proximal the strap slit;

an insert coupled to the headband, the insert being selectively positioned within the headband through the band top edge between the band front side and the band back side, the insert having an insert front side and an insert back side, the insert having a pair of adjustment apertures extending therethrough;

a plurality of forehead pads coupled to the insert, each forehead pad being coupled to the insert front side and configured to align with a plurality of acupressure points between the user's temples, each forehead pad being obround, the plurality of forehead pads being arranged in two arrays of three forehead pads; and a pair of temple pads coupled to the insert, each temple pad being coupled to the insert back side and configured to align with the user's temples while the headband is worn, each of the temple pads having a pad portion and an adjustment string portion coupled to the pad portion, each pad portion having a cylindrical section and a hemispherical section, the adjustment string portion being slidably coupled through the respective adjustment aperture, the adjustment string portion including a loop and a slider.

* * * * *